(12) United States Patent
Miethlinger

(10) Patent No.: US 10,948,393 B2
(45) Date of Patent: Mar. 16, 2021

(54) RHEOMETER

(71) Applicant: LEISTRITZ EXTRUSIONSTECHNIK GMBH, Nuremberg (DE)

(72) Inventor: Jürgen Miethlinger, Gampern (AT)

(73) Assignee: LEISTRITZ EXTRUSIONSTECHNIK GMBH, Nürnberg (DE)

( * ) Notice: Subject to any disclaimer, the term of this patent is extended or adjusted under 35 U.S.C. 154(b) by 198 days.

(21) Appl. No.: 16/074,583

(22) PCT Filed: Feb. 1, 2017

(86) PCT No.: PCT/EP2017/052112
§ 371 (c)(1),
(2) Date: Aug. 1, 2018

(87) PCT Pub. No.: WO2017/134084
PCT Pub. Date: Aug. 10, 2017

(65) Prior Publication Data
US 2019/0041311 A1    Feb. 7, 2019

(30) Foreign Application Priority Data
Feb. 2, 2016  (DE) .................. 10 2016 201 537.0

(51) Int. Cl.
*G01N 11/08* (2006.01)
*G01N 11/00* (2006.01)
(52) U.S. Cl.
CPC ............. *G01N 11/08* (2013.01); *G01N 11/00* (2013.01); *G01N 2011/002* (2013.01)

(58) Field of Classification Search
CPC .. G01N 11/08; G01N 11/00; G01N 2011/002; G01N 11/02
See application file for complete search history.

(56) References Cited

U.S. PATENT DOCUMENTS

| 2,948,145 A | 8/1960 | Eolkin |
| 4,641,535 A | 2/1987 | Malguarnera |
| (Continued) | | |

FOREIGN PATENT DOCUMENTS

| DE | 4220157 A1 | 1/1993 |
| DE | 19848687 A1 | 4/2000 |
| (Continued) | | |

OTHER PUBLICATIONS

English Translation of Notice of Reasons for Refusal, Application JP 2018-558491, dated Feb. 18, 2020, 4 Pages.

(Continued)

*Primary Examiner* — Xin Y Zhong
(74) *Attorney, Agent, or Firm* — Lucas & Mercanti, LLP; Klaus P. Stoffel

(57) ABSTRACT

A rheometer for determining and/or monitoring the flow behavior of viscous fluids, in particular plastic melts and plastic solutions, includes a housing, in which at least one substantially rectilinear channel is formed between an inlet opening and an outlet opening, the channel having a rectangular cross section, and a plurality of pressure measuring devices which are arranged along the channel, wherein the channel is provided over its length with a cyclically narrowing and widening cross section.

10 Claims, 3 Drawing Sheets

(56) References Cited

U.S. PATENT DOCUMENTS

| | | | |
|---|---|---|---|
| 5,277,058 | A | 1/1994 | Kalyon et al. |
| 6,386,016 | B1 | 5/2002 | Gleissle |
| 7,784,330 | B2 | 8/2010 | Angelescu |
| 2004/0255648 | A1* | 12/2004 | Sparks ................ G01F 1/8472 73/54.41 |
| 2008/0134765 | A1* | 6/2008 | Baek .................... G01N 11/08 73/54.09 |
| 2009/0090172 | A1 | 4/2009 | Angelescu et al. |
| 2011/0000657 | A1 | 1/2011 | Ruckwied et al. |

FOREIGN PATENT DOCUMENTS

| | | |
|---|---|---|
| DE | 102008062704 A1 | 8/2009 |
| GB | 2077436 A | 12/1981 |
| JP | 2004284032 A | 10/2004 |
| JP | 2010530545 A | 9/2010 |

OTHER PUBLICATIONS

Köpplmayr, T. et al: A novel online rheometer for elongational viscosity measurments of polymer melts. In: Polymer Testing, 50 (2016), pp. 208-215.

Horvat, M. et al: A multiple-step slit rheometer for rheological characterization of extruded starch melts. In: Journal of Food Engineering, 116 (2013), pp. 398-403.

E. Becker, "Die effektive Viskosität bei viskometrischer Druck-Schlepp-Strömung mit Anwendung auf Extruder und Gleitlager", Materialwissenschaft Und Werkstofftechnik., DE, (Dec. 31, 1978), vol. 9, No. 12, doi:10.1002/mawe.19780091210, ISSN 0933-5137, pp. 452-459.

H.-J. Luger; J. Miethlinger, "Study of glass-fiberreinforced polypropylene in elongational and shear rheometry", Advances in Plastics Technology Conference, Sosnowiec, Poland, (2015), pp. 1-10.

Miethlinger, Polymer Extrusion Und Compounding—Aktuelle Forschungsarbeiten. 24. Leobener Kunststoff-Kolloquium, Montanuniversität Leoben, (2015), pp. 1-23.

English Translation of Notice of Reasons for Refusal, Application JP 2018-558491, dated Sep. 17, 2019, 4 Pages.

Indian Examination Report dated Oct. 27, 2020, Application No. 201827029344, 6 Pages.

\* cited by examiner

RHEOMETER

CROSS-REFERENCE TO RELATED APPLICATIONS

The present application is a 371 of International application PCT/EP2017/052112, filed Feb. 1, 2017, which claims priority of DE 10 2016 201 537.0, filed Feb. 2, 2016, the priority of these applications is hereby claimed and these applications are incorporated herein by reference.

BACKGROUND OF THE INVENTION

The invention relates to a rheometer, in particular for determining and/or monitoring the flow behavior of thermoplastics.

Thermoplastics are normally processed by means of extrusion processes or injection-molding processes. For material preparation, compounders or co-rotating twin screw extruders are normally used. In this case, the plasticization of the plastics is normally realized by screw plasticizing units. The plasticized plastic melts are generally non-Newtonian fluids, which exhibit time- or shear rate-dependent behavior. Here, the viscosity is not a constant, but rather varies with the shear rate. However, plastic melts and plastic solutions also exhibit complex extensional rheology behavior since the extensional viscosity is dependent on the strain rate and the stress duration and specific effects occur, such as for example strain hardening. From, for example, H.-J. Luger, J, Miethlinger: Study of glass-fiber-reinforced polypropylene in elongational and shear rheometry. Advances in Plastics Technology Conference, Sosnowiec, Poland (2015) or Miethlinger: Polymer Extrusion und Compounding [Polymer extrusion and compounding]—current research work. 24th Leoben Plastics Colloquium, Montanuniversität Leoben, Austria (2015), it is known that extensional rheology investigations are able to deliver important additional information in comparison with pure shear rheology experiments. As a result of this, very complex processes arise when processing thermoplastics, which processes can be captured mathematically and described theoretically only to a limited extent. It is possible only to a limited extent for said processes to be simulated or investigated experimentally in order for example to record and to optimize, and also to further develop, the quality of the plasticization processes. This applies in particular to barrier screws and screws with extension elements which are used mainly for plasticization. Of particular importance in this case are wave screws and energy transfer screws.

In order to investigate the viscosity of plasticized non-Newtonian materials, a device for measuring viscosity, in which the material produced from an extruder screw is pressed through a rectangular slot, was proposed in DE 42 20 157 A1. A multiplicity of pressure sensors are provided in the channel-like slot.

A device for measuring the inner friction of liquid substances is known from DE 34 90 044 T1. In addition to the friction, the coefficient of friction of liquids can also be determined by means of said device. For this purpose, a sleeve through which the liquid flows is provided. Within the sleeve, a constriction may be provided, this working in a manner similar to a Venturi tube. For the purpose of recording measurement values, thermometers are provided.

DE 195 29 578 A1 presents a further device for determining rheological properties of flowable substances. The slot rheometer proposed in said document has a tapering annular gap at which pressure measurements are performed.

DE 198 46 579 C1 describes a device for determining the pressure decrease when plasticized masses flow through a capillary with a defined cross section and defined length. Here, melt is pressed through the capillary by means of a pump which is able to be regulated volumetrically. Monitoring of the flow processes may be realized by means of pressure transducers and temperature measurement transducers.

A rheometer with a settable gap is already known from U.S. Pat. No. 5,277,058 A. Shear rates and shear forces can be determined by means of the rheometer.

Although the rheometers known from the prior art are able to capture specific processes during the flow of non-Newtonian fluids, due to the respective construction of the rheometer, these are limited to very singular applications and do not permit reproduction of the quality of the complex processes of plasticization by way of kneading and conveying elements, barrier screws, wave screws and/or energy transfer screws.

The prior art thus shows different continuously working rheometers, so-called extrusion rheometers, which have one or more melt channels or fluid channels. Here, the multiple channels are in each case normally connected in parallel in order for it to be possible to record multiple measurement values with different shear rates by way of one measurement process. However, it is not possible in this way for the complex processes in plasticizing screws, in particular barrier screws, to be simulated or investigated.

SUMMARY OF THE INVENTION

The invention is based on the object of providing a rheometer which is able to be used in particular for process monitoring and for the development and research of screw plasticizing units with barrier screws, wave screws and energy transfer screws and other extension elements.

According to the invention, it is thus provided that the rheometer has a housing in which at least one substantially rectilinear channel is formed between an inlet opening and an outlet opening. The channel is in this case provided with a rectangular cross section. Pressure measurement devices are arranged along the channel. According to the invention, the channel is formed such that it is provided over its length with a cyclically narrowing and widening cross section.

In a particularly advantageous refinement of the invention, it is provided that two channels are provided, which are parallel to one another and which are separated from one another by at least one web. The web forms, together with a housing wall opposite said web, a gap, with the result that a flow from one of the channels into the other channel through the gap is possible.

In order to investigate, to simulate and/or to monitor the complex processes in processing screws, such as barrier screws, wave screws and energy transfer screws, it should be noted that the flow process in such screw plasticizing units is very complex and consists of a superposition of drag flows and pressure flows. The drag flow is in this case a consequence of the screw rotation, while the pressure flow is a consequence of the tool resistance produced by the screw. It is thus possible by means of the rheometer according to the invention for the processes in a screw to be simulated experimentally and for the advantages of extensional rheology to be used advantageously for the process monitoring by way of the multiple shear and extensional deformation of the melt or solution according to the invention.

The construction of the rheometer according to the invention has the effect that no drag flow occurs in the non- Newtonian fluid, but rather the pressure flow behavior of the non-Newtonian fluid can be investigated in a manner decoupled from drag flows.

According to the invention, plasticized flowable material is introduced through the inlet opening. This may be realized by means of extruders, gear pumps or the like. For process monitoring during extrusion, injection-molding or compounding processes, it is possible for part of the conveyed material to be guided into the rheometer, if appropriate with the interposition of an additional pump.

In order to keep the temperature constant, it will be advantageous to additionally heat the rheometer, for example to a temperature of between 180 and 300° C. According to the invention, however, it is also possible for the fed material to be plasticized only partially in order in this way also to record experimentally, and/or to monitor online, the melting behavior which occurs in barrier screws.

The cross sections of the channel, which are variable according to the invention, give rise to different pressure profiles depending on the cross-sectional areas which are in each case present. In this way, it is possible in particular during the online monitoring of production processes for conclusions to be drawn about the composition and quality of the thermoplastic material. Here, it should also be noted in particular that materials used in industry contain additive substances and thus form compounds. The behavior of the additive substances is dependent on different parameters and can change during the production process. Such changes can be detected at an early stage by means of the online monitoring, thus allowing suitable measures for maintaining high-quality production, such as for example regulation concepts, to be taken.

According to the invention, when using two channels which are parallel to one another, it may prove to be important that the narrowing and widening cross sections of the two channels are different from one another. This means that, starting at the inlet opening, the cross section of the one channel narrows, while the cross section of the other channel widens. Consequently, in relation to the respective channel length or run length of the channel, different pressure conditions prevail in the two channels, which lead to different flow transfer behavior of the fluid through the gap of the web. According to the invention, the gap may in this case have the same height over the entire length of the channels. It is also possible, however, for the gap height to be varied.

In a particularly favorable refinement of the invention, it may be provided that the web has a profiled top edge. This profiled top edge, which may be formed to be rectangular, hyperbolic, wave-like or with another dimensioning, results in different flow conditions from one channel into the other. The rheometer according to the invention is thus able to be used universally to determine complex flow conditions experimentally.

According to the invention, the web may be formed so as to be detachable, with the result that, with channel structurings remaining the same, different flow transfer conditions from one channel to the other channel can be achieved.

In a preferred refinement of the invention, it is provided that the narrowing and widening cross sections of the channel are formed by a profiled channel wall. This means that one of the walls of the channel, which is preferably formed with a rectangular cross section, is profiled, for example so as to be, in side cross section, sinusoidal, trapezoidal or sawtooth-like or similar. Here, three side walls of the channel are formed to be planar and unchanged over the run length of the channel, while the fourth wall is provided with the profiling. It is preferable in this case for the slot of the web to be assigned to the non-profiled wall of the channel.

In a preferred embodiment, the rheometer according to the invention thus has two channels which are parallel to one another. According to the invention, however, it is also possible for a larger number of channels, for example four channels, to be provided, said channels running parallel to one another and in each case being separated from one another via a web which is provided with a flow transfer gap. Flow transfer of the fluid from one channel into an adjacent channel is thus possible. This simulates the processes in specific designs of barrier screws, wave screws and/or energy transfer screws, thus allowing the pressure-throughput behavior of these screws to be determined experimentally. Since no drag flow is present in the rheometer according to the invention, it is possible for the measurement data to be interpreted more easily and to be associated with the physical processes which occur. This results in numerous possibilities, such as for example the recording of the influence of the flow transfer web, of the wave design of the melt channels or of the substance behavior of the fluid, including the extensional viscosity, on the pressure-throughput behavior. The multiple shear and extensional deformation additionally allows the advantages of extensional rheometry to be able to be used in a special way for the process analytics and process monitoring.

Use may thus be made of the rheometer according to the invention for simulating a wide variety of processes, including investigating the properties of the fluids involved. Correspondingly, the rheometer is suitable for ongoing process monitoring to be able to determine changes, arising during a production process in the properties of the materials. In this way, a high-quality and reproducible quality of the production processes is possible.

The dimensioning of the channels of the rheometer according to the invention may be matched to the respective conditions. In this case, it may be favorable if the width of the channel is significantly larger than the height of the channel, in relation to the respective channel cross section. The width may in this case be greater than or equal to a factor of 5, or a factor of 10, in relation to the channel height. In this way, reliable flow behavior is ensured to the same extent as a reliable throughflow of the channel in analogy with the flow conditions which arise in a screw. The width of the channel, which is greater by a factor of between 5 and 10 in relation to the height of the latter, takes into consideration the wall adhesion and wall friction of the fluid and serves for improved simulation of the flow conditions.

In order to be able to simulate the flow conditions in a screw, in particular a barrier screw, and to be able to use the advantages of extensional rheometry in a special way for the process analytics and the process monitoring, it may be favorable for the channel to have, over its entire length, between one and fifteen narrowing and widening cross sections, preferably in equal numbers.

The web according to the invention, which separates adjacent channels from one another, may have a width of between 3 mm and 20 mm.

Thus, with regard to its construction and its mode of operation, the rheometer according to the invention is suitable for replicating geometries which occur in particular in barrier screws, wave screws and/or energy transfer screws, and for generating not only different shear rate profiles but also different strain rate profiles in the material to be investigated, with the result that these flow processes in the rheometer are able to capture very small variations in the quality of the material by way of temporal changes of the pressure signals. As a result of the slot which the web forms together with the inner wall of the rheometer, it is possible to provide pressure flow processes which are identical or at least come very close to the real conditions in the screws described. In this way, the rheometer can particularly preferably be used both for basic research and for ongoing process monitoring.

BRIEF DESCRIPTION OF THE DRAWING

The invention will be described below on the basis of exemplary embodiments in conjunction with the drawing. In the figures.

DETAILED DESCRIPTION OF THE INVENTION

Figure 1:
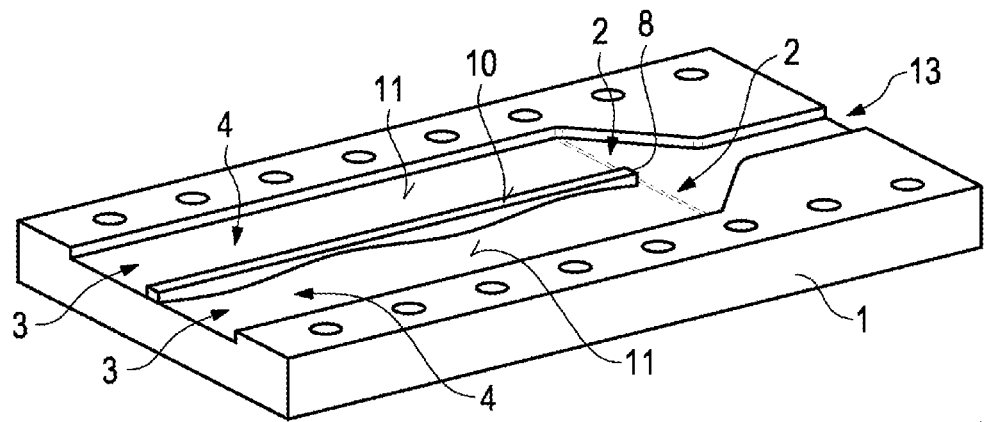
FIG. 1 shows a perspective partial view of a first exemplary embodiment of the rheometer according to the invention.
Figure 2:
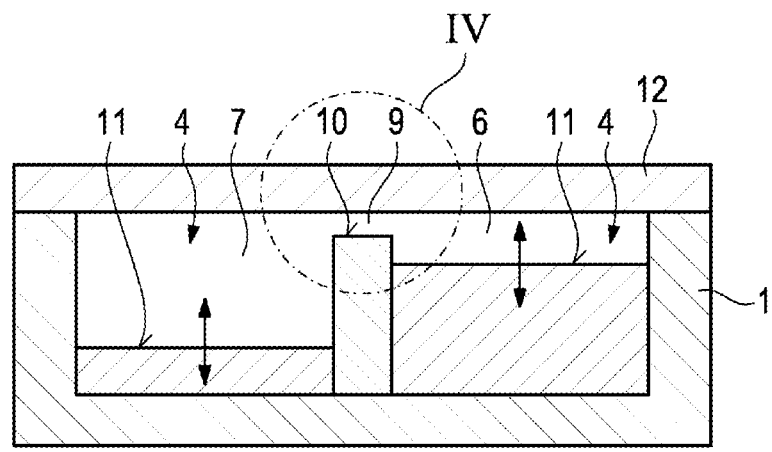
FIG. 2 shows a sectional view of the rheometer shown in FIG. 1.

FIG. 1 shows an exemplary embodiment of a rheometer according to the invention in the open state. In this regard, FIG. 2 shows a sectional view for the purpose of explanation. The rheometer has a housing 1 in which two channels 4 which are parallel to one another are formed. These are separated from one another by a web 8 which may be formed so as to be detachable. The web 8 has a top edge 10 which forms a spacing to the inner wall of a cover plate 12. This gives rise to a gap 9 (see in particular FIG. 2 and FIGS. 4a to 4c).

As FIG. 1 shows, the housing is provided with an inflow distributor 13, which distributes an inflowing fluid mass to inlet openings 2 of the two parallel channels 4. The fluid thus flows through the channels 4 and exits through outlet openings 3. For clarification, the arrangement is illustrated again in FIG. 5, FIG. 5 also shows an additional pump 14 which may be provided for conveying the fluid.

Figure 5:
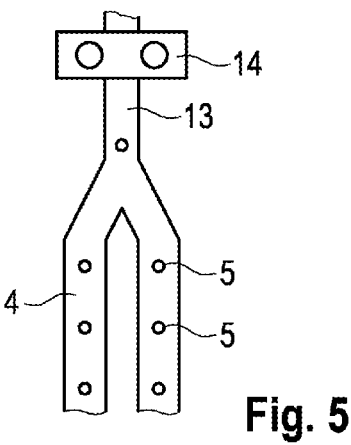
FIG. 5 shows a simplified plan of the illustration according to FIG. 1, and FIGS. 6 to 8 show examples of different profilings of the channel wall.

In the region of the channels, pressure measurement devices 5 are provided, as illustrated in FIG. 5. Additionally, it is also possible for temperature measurement devices (not shown) to be provided.

Figure 3:
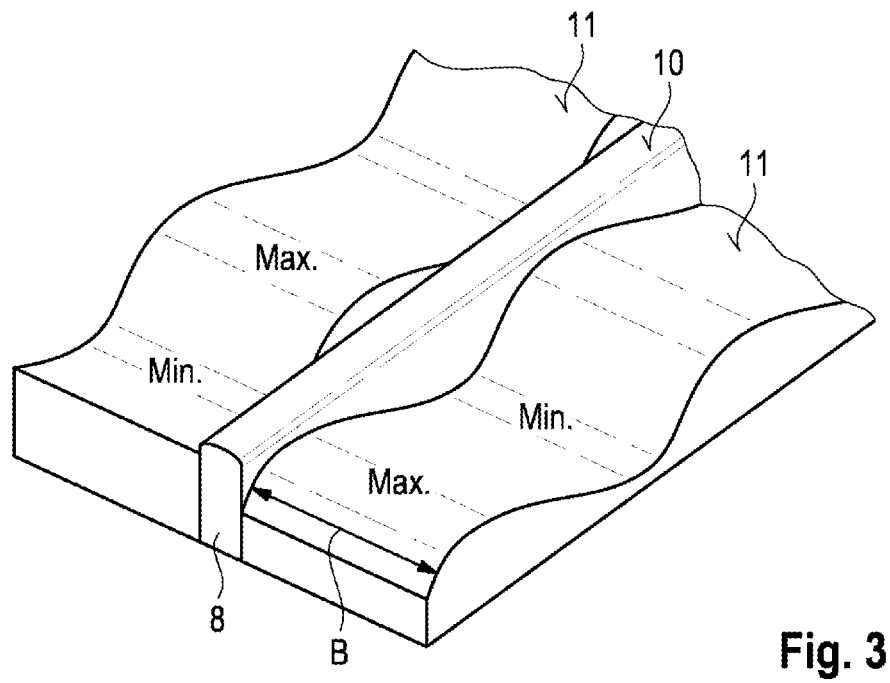
FIG. 3 shows a perspective illustration which is analogous to FIG. 1, FIGS. 4a to 4c show simplified cross-sectional shapes of the web according to the invention.

As can be seen in particular in FIGS. 1 to 3, the channels 4 each have different channel cross sections. For a constant width B of the channels, this thus leads to a variable height H of the respective channel or of the effective channel cross section resulting from the width B and the height H.

The different profilings of the lower wall according to FIG. 1 of the channels 4 can be seen from the sectional view in FIG. 2. This also shows in a clarifying manner in particular the gap 9 which is formed between the top edge 10 and the cover plate 12. It is self-evident that the fluid mass flowing through has different pressures depending on the respective channel cross section, which pressures thus also lead a different flow transfer behavior through the gap 9.

Figure 6:
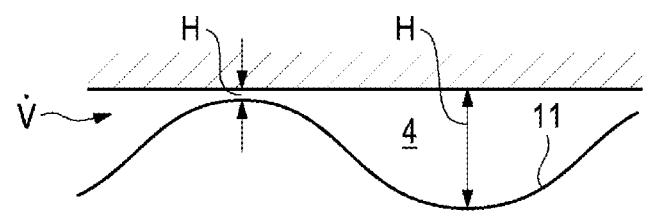
Figure 7:
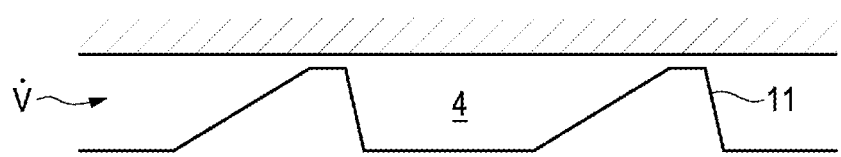
Figure 8:
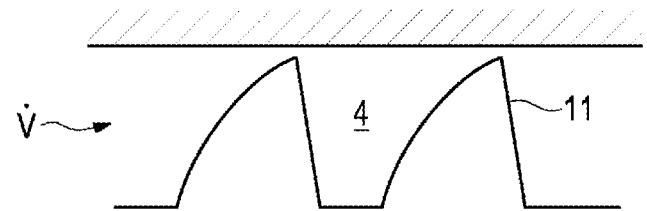

The profiling of the wall of the channel 4 thus forms minima and maxima, as shown in FIG. 3. In this regard, FIGS. 6 to 8 show different possible profilings. According to FIG. 6, the profiling is, as also illustrated in FIGS. 1 and 3, realized in a sinusoidal manner, while FIGS. 7 and 8 show a trapezoidal or sawtooth-like profile. It can be seen from this that, in relation to the flow direction, which is from the left according to the arrow in FIGS. 6 to 8, a relatively slow increase in the reduction of the channel cross section occurs, this being associated with a relatively slow pressure increase. Following the maximum, with the smallest channel cross section, a relatively rapid increase in cross section occurs according to FIGS. 7 and 8.

In the exemplary embodiments shown, the entire length of the respective channel may be between 100 mm and 400 mm. The width B of the channel may be between 15 and 40 mm, while the smallest height, at a maximum of the structuring of the channel wall (FIG. 3), may be 0.6 to 2.0 mm. The maximum height, at a minimum profiling, may be between 3.0 and 8.0 mm, as also illustrated in FIG. 6. Depending on the geometries to be investigated or monitored and the respective properties of the fluid, alternate switching of between one and fifteen maxima and one and fifteen minima of the channel cross section over the entire length of the channel is possible according to the invention. It is preferable for these narrowing cross sections 6 and widening cross sections 7 (see FIG. 2) to be formed in each case so as to alternate in adjacent channels, with the result that a pressure maximum prevails in one channel, while, at the same run length, a pressure minimum is formed in the other channel.

Figure 4A:
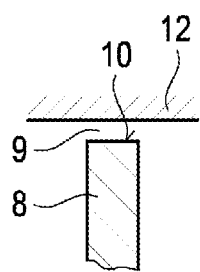
Figure 4B:
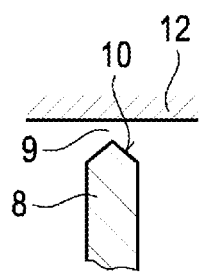
Figure 4C:
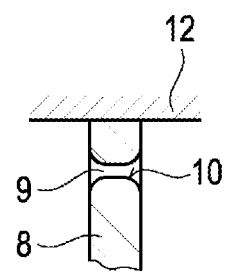

FIGS. 4a to 4c show different profilings of the top edge 10 of the web 8. While FIG. 4a forms a rectangular shape with a planar top edge 6 for the formation of the gap 9, the top edge 10 according to FIG. 4b is hyperbolically rounded. It is also possible for a wave-like structuring of the top edge to be provided over the width of the web. FIG. 4c shows a further variant in which an upper and a lower web are used, with the gap 9 being able to be situated in the central region of the web. As explained, it is also possible to shape the web 8 in a variable manner over its length, with the result that extensional flow processes can be generated via the web too.

The rheometer may be used in different installation positions in order to carry out a practical simulation or monitoring of the processes of a plasticizing unit or of a screw.

The rheometer according to the invention thus allows an experimental screw simulation, in particular for the experimental determination of the pressure-throughput behavior. Since no drag flow is generated in the wave rheometer according to the invention, it is possible to investigate the pressure flow behavior of the fluid in a manner decoupled from drag flows. This allows a simpler interpretation of the measurement data and of the associated physical processes. By way of suitable temperature control, it is also possible to provide the feeding of the fluid in an only partially plasticized state in order to experimentally record and analyze the melting behavior. Overall, the rheometer allows the extensional flow behavior of the fluids to be investigated. One particularly important aspect of the invention is to monitor an ongoing production process by means of the rheometer in order to be able to respond to changes in the properties of the fluid. It is self-evident that use may be made of the wave rheometer for the process monitoring of a wide variety of fluid types and fluid processing machines, that is to say also for processes without plasticization.

LIST OF REFERENCE SIGNS

1 Housing
2 Inlet opening

3 Outlet opening
4 Channel
5 Pressure/temperature measurement device
6 Narrowing cross section
7 Widening cross section
8 Web
9 Gap
10 Top edge
11 Channel wall
12 Cover plate
13 Inflow behavior
14 Pump

The invention claimed is:

1. A rheometer for determining and/or monitoring the flow behavior of viscous fluids, in particular plastic melts and plastic solutions, having a housing in which at least one substantially rectilinear channel is formed between an inlet opening and an outlet opening, wherein the channel has a rectangular cross section, and having multiple pressure measurement devices which are arranged along the channel, wherein the channel is provided over its length with a cyclically narrowing and widening cross section, wherein two channels which are parallel to one another and which are separated from one another by means of at least one web are formed, wherein the web forms, together with a housing wall, a gap, and wherein, in relation to a respective channel length, the narrowing and widening cross sections of parallel channels are different from one another.

2. The rheometer according to claim 1, wherein the web has a profiled top edge.

3. The rheometer according to claim 1, wherein the narrowing and widening cross section of the channel is formed by a profiled channel wall.

4. The rheometer according to claim 3, wherein the channel wall is, in cross section, of sinusoidal, trapezoidal or sawtooth-like form.

5. The rheometer according to claim 1, wherein the channel wall has multiple narrowing and widening cross sections over its length.

6. The rheometer according to claim 1, wherein the channel has a width B which satisfies the equation $B \geq 5\,H$, where H is defined as the height of the channel.

7. The rheometer according to claim 1, wherein the channel has, over its length, between one and fifteen narrowing and widening cross sections.

8. The rheometer according to claim 1, wherein the web is formed so as to be detachable.

9. The rheometer according to claim 6, wherein $B \geq 10\,H$.

10. The rheometer according to claim 7, wherein there are equal numbers of the narrowing and widening cross sections.

* * * * *